D. W. LAKE
March 28, 1933. AIR HEATER Re. 18,777
Original Filed Dec. 7, 1927
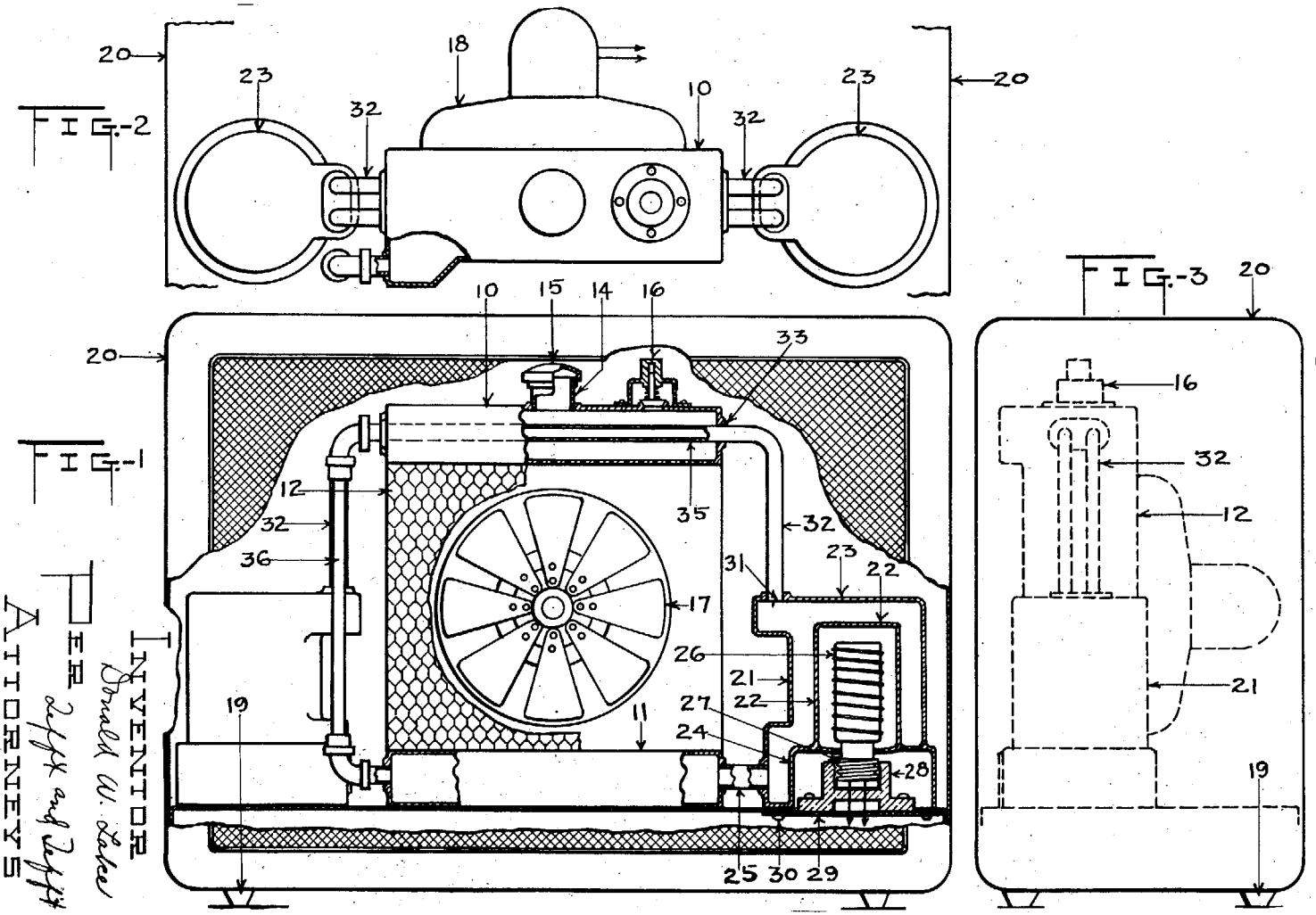
INVENTOR
Donald W. Lake
PER Lefft and Lefft
ATTORNEYS Reissued Mar. 28, 1933

Re. 18,777

UNITED STATES PATENT OFFICE

DONALD W. LAKE, OF CHICAGO, ILLINOIS

AIR HEATER

Original No. 1,767,082, dated June 24, 1930, Serial No. 238,253, filed December 7, 1927. Application for reissue filed February 12, 1932. Serial No. 592,813.

This invention relates to air heaters, and more particularly to fan-driven, warm air projecting heaters.

One of the objects of the invention is in the provision of a heating arrangement, including a radiator type of heater, wherein there is provided a fan member rearwardly thereof in a manner to project a blast of relatively cold air through the radiator portion, thereby warming the relatively cold air and projecting same into the chamber which is desired to be heated, and also a special arrangement of connecting means between the upper and lower portions of the radiator, the same including a resistance element combined therewith to heat quickly or rapidly vaporize the water and thereby create an efficient circulation of the heating medium and a consequent increased efficiency in the heater itself.

Another object resides in providing a warm air projecting type of heater using a fan member and a radiator portion, there being also included a special form of heating member to create a circulation of the heating medium, this heating element including a water containing member surrounding an electrical heating element, said water containing member being connected with the upper and lower portions of the radiator to materially assist circulation and therefore increase greatly the efficiency of the heater.

Still another object lies in the provision of an air projector type of heating member including a radiator portion having a water containing element disposed below the radiator portion, a heating medium distributing header above the radiator portion, a fan disposed rearwardly of the radiator portion and adapted to project air through the radiator, the circulation of warm water and condensed steam therethrough warming the relatively cold air and permitting warm air to be projected into the chamber to be heated, and also a specific type of electrical heating element creating a rapid circulation of the water in its gaseous and liquid states, said heating element or elements including a removable electrical resistance member and a surrounding water containing element connected with the upper and lower portions of the radiator, said element being fashioned in a manner to permit rapid heating of the water passing therethrough.

Other objects will appear in the following specification, taken in connection with the annexed drawing, in which—

Fig. 1 is a front elevation of my air projector type of heater, the same being cut away in various portions to show in sectional and detail manner the main elements thereof;

Fig. 2 is a plan view from above, showing the general arrangement of parts; and

Fig. 3 is a side elevational view showing the general form of the assembled units.

Before referring to the drawing, it might be stated that generally, this type of heater has been known heretofore, and the advantages which result in the forced projection of air through a continuously warm radiator section are well known; however, the devices heretofore known are, in many instances, not only very cumbersome in general formation and arrangement of parts, but also, and more particularly, are slow in creating the general circulation of the warm water through the radiator sections, as well as accomplishing this circulation in either an expensive or a far from simple manner.

Applicant has, for many years, been interested in the development and sales of heating members and appreciating the difficulties which have arisen in connection with this type of heater, has now devised a unitary and simple, warm air projecting heater, which not only is readily accessible to service, which is sometimes necessary in this type of machine, but also provides a means for heating and circulating the water through the radiator which is accomplished at a minimum cost and with a simplicity of mechanical arrangement.

Referring to the drawing, there is shown therein what may be generally referred to as a radiator section, same including an upper distributing header 10, and lower container portion 11, said header and container being connected by a plurality of connecting portions 12, which may be of any shape desired, the same being in the present instance, of a slotted nature. It may be stated at this time that any type of radiator formation might just as well be used, and applicant in no way limits himself to the particular radiator portion shown herein.

Upstanding from the header 10 is a water receiving neck 14, to which is removably connected a conventional cap member 15. Also, there is shown connected to the upper container a safety valve 16 of conventional design, it being understood, of course, that any type of safety device might just as well be attached to or form a part of the radiator section. A fan 17 is disposed rearwardly of the radiator section heretofore described, the same comprising a conventional fan member and being so well known as to obviate the necessity of describing it in detail. It has been thought necessary merely to state that it is an electric fan having bladed portions adapted when rotated to project a blast of relatively cold air through the tubular or otherwise formed radiator section heretofore described. This fan is connected to a framing portion 18, which is also attached to the radiator formation in any suitable manner.

Means for elevating the combined radiator and fan portion slightly is accomplished by means of the plural leg portion 19, which may be of any form, shape or height desired.

There is also found a surrounding casing 20 enclosing the radiator and circulating media later to be described, said casing conforming generally to the shape of the radiator and enclosing the entire assembly in a neat and compact manner. This casing 20 preferably is made, as shown in the drawing, with its sides, top and bottom, and rear wall completely closed, and its front partially or wholly open to the chamber to be heated. From this it results that all circulated air, both incoming and outgoing, must pass through the open (screened) front of the casing. Means for circulating the water in the radiator portion is provided in the following mechanism. Inasmuch as the device shown in the drawing discloses a plurality of electric water heating and circulating devices, it is thought necessary to describe only one of such devices, and therefore numerals which are used to designate the portions of said mechanism may be assumed to be applied to the heating device upon the opposite side also.

Disposed at one side of the radiator portion, and compactly fitted thereto at the lower side, is a housing 21, which is adapted to surround an inner, similarly shaped portion 22 in a manner to form a rather thin, circular, or as a matter of fact, any shape of water housing portion, the upper and lower ends of which are enclosed respectively by the top portion 23 and the lower member 24. This circular and thin water containing receptacle is connected to the lower container 11 by means of the connection 25, it being apparent that the water in said lower container 11 may readily flow into the water heating container above described. Disposed within the circularly or otherwise formed water container, is an electrical resistance element 26, conventional in form and adapted, upon the completion of the electrical circuit, to become heated substantially immediately, and therefore to transmit the heat given off therefrom, to the thin walled water container in a manner to quickly heat the water contained therein. This electrical resistance element 26 is removably connected, as at 27, with a socket portion 28 securely attached to a plate portion 29. This plate portion is not only adapted to be, but is actually, formed in a readily removable manner, as shown at 30, this detachable connection permitting removal of the resistance element, and if same either has become fatigued, or damaged in any manner, it may be easily replaced.

Opening through, as at 31, and projecting upwardly from the electrically heated, thin walled water container, are a plurality of tubes 32, which rise in substantially vertical manner, the same passing through similarly formed apertures 33 in the sides of the header 10 and are projected into said upper container in a horizontal manner, it being noted that the portions of the tubes which lie within the header 10 have a series of slots or apertures 35 disposed upon the under side thereof, the same being provided to permit the circulating medium to pass therethrough in substantially uniform manner into the upper portion of the radiator, with the result that the water and condensed steam will pass evenly through that portion of the radiator through which the relatively cold air is projected by the fan disposed rearwardly thereof.

Adjacent the radiator portion, a water gauge 36 is disposed in a manner to be readily observed by the operator.

Having described the structural arrangement of my warm air projecting heater, the operation of same will now be described.

The radiator has poured thereinto through the neck 14 a substantial amount of water, the amount depending upon whether water (mingled with some steam) or steam only is to circulate from the heater to the distributing header 10. If steam only is the circulating medium, the water level, referring specifically to gauge 36, will ordinarily be about half way up the radiator; although the device will operate in an efficient manner even if the water level be substantially lower. When water is to be used as the circulating heating medium, the water level must, of course, substantially correspond to the level of the pipe 35.

When the electric circuit has been completed, the fan commences rotation and the resistance element will immediately begin to heat, the heat therefrom substantially immediately heating the water in the surrounding thin walled container. Due to the fact that the heat rays from the resistance element are acting upon a rather thin volume of water, the same will be heated very quickly, with the result that the water, when it has reached a sufficient temperature, will be forced by thermal action upwardly through the tubes 32 and into the upper portion of the radiator described as 10, the hot water or steam, as the case may be, passing in uniform manner from said tube and therefore downwardly through the connecting portions 12, which connect the upper and lower portions of the radiator. This passage of the hot circulating water or condensed steam through the radiator operates to warm the relatively cold air from the fan which is being forced through the radiator, and therefore permits forced projection of warm air into the chamber desired to be heated. It need not be stated that this type of air not only is especially healthful but, due to the manner of projection, may be forced into that portion of the chamber which is most beneficial to health, therefore accomplishing a more efficient heating operation than if other types of heating structures were used.

Due to the construction of the casing with only its front open to the chamber to be heated, the incoming relatively cold air must pass over the hot surfaces of the heating units 21, pipes 32, header 10, and through those portions of the radiator 12 which are not directly in front of the fan. In this manner the incoming air is preheated and the outgoing blast is hotter than it would be otherwise. This results, of course, from the fact that the cross sectional area of the cylindrical hot air blast comprises only a relatively small portion of the entire area of the front opening in the casing.

With the type of electrical heating unit shown by applicant herein, the water not only will be quickly and efficiently heated, but will permit an efficient heating operation to be accomplished within a much shorter time than is accomplished by other forced types of heating devices. The electrical unit, due to its peculiar combination with the thin walled container, operates in a very efficient manner.

Applicant calls attention to the compact structural formation of his device in which he not only has shown one electrical heating element, but as a matter of fact, a plurality thereof, it being possible in some installations that one heating element might not be sufficient, and for this reason he has shown herein two, although the principle of the invention would include the use of a single electrical heating element if this were sufficient to accomplish the desired heating result.

What I claim is:

1. In a heat exchange device, a casing having a bottom, top, three closed sides and one open side, a radiator having spaced upper and lower longitudinal headers positioned adjacent said open side, a water jacket having a heating element therein, a tube connecting said water jacket with the upper header of the radiator, a tube connecting the water jacket with the lower header of the radiator, said jacket and tubes being positioned adjacent the aforesaid open side, a fan positioned within the casing and to the rear of the radiator, and means for driving the fan.

2. In a heat exchange device, a casing having a bottom, top, three closed sides and one open side, a radiator having spaced upper and lower longitudinal headers positioned adjacent said open side, a water jacket, a heating element for said jacket, means connecting said jacket with the upper and lower headers of the radiator, said jacket and connecting means being positioned adjacent the open side of the casing, a fan positioned within the casing to the rear of the radiator, and means for driving said fan.

3. In a heat exchange device, a casing having one open face, a heat dissipating unit positioned adjacent said open face in such manner as to provide an air inlet portion and a draft opening in the open face of the casing, fluid heating means communicating with the heat dissipating unit, and an air blowing unit associated with the heat dissipating unit in such manner that a warm air blast is projected therethrough.

In testimony whereof I have hereunto affixed my signature.

DONALD W. LAKE.